Patented Nov. 7, 1950

2,528,946

UNITED STATES PATENT OFFICE 2,528,946

METHOD OF MANUFACTURE OF MODIFIED ALKYD RESINS AND PRODUCTS

Charles Adams Coffey, William T. Walton, and Norman Britan, Chicago, Ill., assignors to The Sherwin-Williams Company, Cleveland, Ohio, a corporation of Ohio No Drawing. Application November 19, 1947, Serial No. 787,030

8 Claims. (Cl. 260—22)

1

This invention relates to the simultaneous manufacture of a dehydrated castor oil and its concurrent incorporation with an alkyd resin to form an oil modified resin.

It has been the practice in the manufacture of dehydrated castor oil modified alkyd resins to start with either a dehydrated castor fatty acid or a dehydrated castor oil as the oil modifying portion. Oil modified resins have been heretofore developed by well known methods, such as esterification of the fatty acids in part with a polyhydric alcohol, or by alcoholysis of the triglyceride to form mixed fatty acid glycerides, or other fatty acid alcoholates as an intermediate step in the formation of the oil-alcoholate-phthalate mixed ester polymers. The reactions are effected by heating either in a common volatile solvent under reflux conditions or by direct heating.

One objection to the above procedures is that dehydrated castor oil and its acids are quite reactive and it is often difficult to include high percentages of alkyd forming reactants in the oil modified resin cook without premature gelation during resin formation. Another practical objection is that the castor oil must undergo a heating operation to effect dehydration in the first instance, followed by dissipation of the heat necessary to process and dehydrate the oil. Such a process is wasteful of energy and therefore uneconomical.

While simultaneous dehydration and combination of a raw castor oil in an alkyd type resin has been suggested in the prior art (see German Plastics Practice, pages 254-255 by Bell, Goggins and Gloor; published by Murray Publishing Company, Cambridge, Mass.) the methods suggested, upon trial, failed to produce a completely dehydrated castor oil, and upon attempting variations, particularly in transition from laboratory scale batches to plant scale operations wherein the time to acquire a given temperature increases, the esterification reaction was found to proceed at a more rapid rate than the dehydration reaction with consequent poor dehydration of the raw oil. The formation of insoluble gel particles of straight or partially modified alkyd in the partially dehydrated oil often occurred. While under certain favorable conditions, it was found to be possible to produce a modified alkyd containing raw castor oil, a major part of which was dehydrated (about 65% of dehydrated oil), the product was inferior for many purposes, particularly for air-drying finishes and for use in coat-

2 ings where optimum chemical and water resistance was required.

It is a general object of this invention to provide a means of controlling the rates of dehydration of castor oil and the esterification of the polybasic acid-polyhydric alcohol components of an oil modified alkyd resin so that a practically completely dehydrated castor oil may be formed, and without undue energy loss, to convert the said dehydrated castor oil into an integral part of an oil modified alkyd resin in a simple and controllable manner, in equipment available wherever alkyd resin varnishes are made.

A more specific object is to prepare a substantially completely dehydrated castor oil, in situ, for immediate use as a component of an oil modified alkyd resin.

Another object is to produce a dehydrated castor oil modified alkyd resin directly from castor oil with but a single heating step wherein heat losses in the processing are minimized.

Still another object is to produce a dehydrated castor oil modified alkyd resin of lighter color and less viscosity than by previous methods of manufacture.

A further object is to produce an oil modified alkyd resin of the type disclosed producing both air dry and baking type films characterized by increased resistance to acids, alkalies and soaps as compared to dehydrated castor oil modified alkyd resins prepared from preformed dehydrated castor oil. Other objects will appear hereinafter.

It has been found in accordance with the invention that the dehydration of raw castor oil and the esterification of a polyhydric alcohol with a polybasic acid can be controlled concurrently so that substantially complete dehydration of the oil, the esterification, and oil resin modification can be achieved during a definite time-temperature cycle in a reaction mixture initially containing the raw castor oil, and at least a part of the polybasic acid and the polyhydric alcohol. The method of control of the process resides in the control of temperature during two phases or steps in the production of the dehydrated castor oil modified alkyd resin. The following procedure illustrates the practice of the invention as applied to the preparation of an oil modified glyceryl phthalate resin.

During the first phase of the preparation, which is predominantly a period of heat input, the phthalic anhydride, glycerine and raw castor oil are mixed in the molar ratio of phthalic anhydride to raw castor oil less than 7:1 and more than 2.5:1, and the molar ratio of glycerine to oil not more than 1.5:1 and not less than 2:3, preferably about 1:1. In approximately three hours the batch is heated up to about 275 degrees C., and held at that temperature for an hour more or less during which period dehydration of the raw oil is completed. During this first period some esterification and alcoholysis occurs at least sufficient to effect compatibility between the processed oil and the esterification products of the reactants.

In the final phase of operation, the temperature of the batch is reduced by both a decrease in the energy input into the batch and by the addition of further quantities of reactants to produce the final composition as to resin content of the modified alkyd resin. If desired only sufficient glycerine may be added to esterify the residual acidity at this point, which will produce a resin of about 37% alkyd content. The preferred oil modified resins are made by the addition of more glycerine and phthalic anhydride at this point to make shorter vehicles of higher alkyd resin content. The temperature is reduced after the initial predominantly dehydration stage to about 230 degrees C., and held at that temperature for about three hours during which time the esterification reaction is practically completed, as indicated by a study of the acid value of the batch versus the time of cook. The batch may then be reduced with appropriate solvent, e. g., xylene, to from 40 to 70% solids to produce useful dehydrated castor oil modified alkyd resin varnishes suitable for many commercial applications.

A longer oil alkyd is also possible by a similar procedure. The castor oil being dehydrated priorly as previously described, but in the second stage of the operation, i. e., esterification, the additional alcohol may be added as a mixed mono- and diglyceride of a selected fatty oil, plus equivalent amounts of phthalic anhydride or other polybasic acid, and processing as above through the second phase of the operation at lower temperatures as shown. A previously prepared dehydrated castor mixed mono- and diglyceride may also be used to replace the said other oil.

Still another means of producing a longer oil modification is by first dehydrating the castor oil as previously outlined, followed by addition of refined oil and glycerine which results in a lowered temperature and completing the heating in the esterification temperature range (see Example VIII).

While other polyhydric alcohols than glycerine can be used, it is to be noted that they are a detriment during the dehydration phase and so far as yet determined can be employed only after the dehydration step has been substantially completed. By far, the best results are obtained if glycerine is used as the sole polyhydric alcohol during the said first stage, i. e., dehydration.

Other polybasic acids, such as are well known in the art of compounding alkyd resins may be used after the dehydration step, but phthalic anhydride has been found to be the preferred acid, both during dehydration and as the alkyd forming acid, in the second phase esterification reaction.

Completion of the esterification phase may be determined by a number of known tests such as determination of acid value reduction, observation of "cure" points (i. e., measurement of the time required for a spot sample to gel under standard conditions of temperature and agitation when exposed on a hot plate designed for such tests), observation of the length of "string" from a paddle, visual and digital examination of a "pill," and viscosity studies.

In the process herein described, it is also preferred that the reaction mass be surrounded with an inert gas, such as has been customary in the industry, so as to prevent deepening of the color of the product, and also that provision be made for passing inert gases through the reaction mass, i. e., sparging, to aid removal of water of reaction and other low molecular weight decomposition products that may be present.

The smallest amount of alkyd resin that may be combined in a completely dehydrated castor oil made by this process will produce a product containing about 37% alkyd resin. However, by extension with other oils or a previously dehydrated hydroxylated fatty oil, resins of greater oil length can be produced as illustrated herein. Higher percentages of alkyd resin in the dehydrated oil modified alkyd, a type more commonly sought, can be readily obtained as is apparent to one skilled in the art.

The following examples, in which the quantities are stated in parts by weight, illustrate the practice of the invention.

*Example I*

3440 parts castor oil
2400 parts phthalic anhydride
400 parts glycerine

The above ingredients were weighed into a stainless steel varnish kettle equipped with agitator, cover and inert gas blow ring and heated to 530 degrees F. in three hours, then held at 276 degrees C. for one hour, whereupon dehydration of the oil had become substantially completed.

1400 parts phthalic anhydride
1696 parts glycerine were then added and in ¾ of an hour the temperature was dropped to 233 degrees C., and held at that temperature for three hours and an acid value of 8.5 on the pill. The batch was then dropped into a thinning tank and reduced to 50% non-volatile material with xylene.

Body 45" (Gardner-Holdt).
Color 6–7 (Gardner-Holdt).

It will be noted that initially during the dehydration phase of the operation the molar ratio of phthalic anhydride to oil was 4.3:1 and the molar ratio of glycerine to oil was 1.8 to 1, and that later additional quantities of ester forming reactants were added to form an oil modified alkyd resin.

*Example II*

500 parts phthalic anhydride
1120 parts castor oil
110 parts glycerine

The above formula states the initial concentration of reactants, and the molar ratio of phthalic anhydride to oil is 2.8:1, and the molar ratio of glycerine to oil is 1:1.

The phthalic anhydride, castor oil and glycerine were weighed into a vessel as in Example I and heated to 270 degrees C., in one hour and 25 minutes. After the castor oil had been substantially dehydrated 82 parts of pentaerythritol were added as shown in the schedule below. The cooking schedule was as follows:

| Time | °C. | A. V. | Body (Gardner-Holdt) | Notes |
|---|---|---|---|---|
| 9:50 | | | | |
| 11:15 | 270 | | | |
| 11:30 | 230 | | | Pentaerythritol started in. |
| 12:00 | 230 | 50 | | Inert gas blow started. |
| 12:30 | 270 | 32 | –F | |
| 1:00 | 270 | 29 | G | |
| 1:30 | 270 | 26 | I | |
| 2:00 | 260 | 20 | –N | |
| 2:30 | 250 | 17 | 5½" | |
| 3:00 | 250 | 14.5 | 6½" | |
| 3:30 | 250 | 11.0 | 8½" | |
| 4:00 | 250 | 7.0 | 32" | |

After the acid value became 7, the batch was thinned to 60% solids with xylene after first cooling to about 150 degrees C.

This example illustrates the use of another polyhydric alcohol than glycerine in the second phase of the operation and further illustrates a near minimum ratio of phthalic anhydride to raw castor oil during the initial or dehydration phase.

*Example III*

950 parts phthalic anhydride
860 parts castor oil
200 parts glycerine

The above ingredients are in the molar ratios of phthalic anhydride to oil of 6.95:1 and glycerine to oil 2.36:1.

The first three ingredients were weighed into a reaction vessel as in prior examples and the temperature taken to 274 degrees C. in three hours, during which 70 parts of water were collected. After 20 minutes at this temperature only six additional parts of water were collected and the oil was only 52½% dehydrated, whereas a batch made within the glycerine to oil ratio of 1.5:1 to 2:3, and the above molar ratio of phthalic anhydride to oil was substantially completely dehydrated within this time-temperature schedule.

This trial illustrates that excessive glycerine to oil ratios during the initial stage results in poor dehydration of the oil. Ratios of this order are shown to be ineffective in accomplishing the objectives of this invention.

*Example IV*

950 parts phthalic anhydride
860 parts castor oil
100 parts glycerine

The above three ingredients, employed in a first phase dehydration step, are noted to be in the molar ratios of phthalic anhydride to oil of 6.95:1 and glycerine to oil of 1.18:1.

The first three ingredients were weighed into a stainless steel reaction vessel similar to the type used in Example I and taken to 270 degrees C. in approximately three hours and held at 270 degrees ±10 degrees C. for ¾ of an hour.

After dehydration of the oil at an elevated temperature 462 parts additional glycerine was added to the batch over a one-half hour period and the temperature fell to 230 degrees C. at which point the temperature was maintained for about 2¾ hours; the last 1½ hours the batch was blown with CO₂, whereupon the batch was cooled and reduced with xylene to 50% solids. The reduced batch had a viscosity of 41" Gardner-Holdt and an acid value of 10 based upon the pill.

The material was clear, indicating complete compatibility, and the molar ratios during the dehydration step as noted above were within critical limits.

*Example V*

500 parts phthalic anhydride
500 parts castor oil
100 parts glycerine

In the above formula the molar ratio of phthalic anhydride to oil is 6.3:1 and of glycerine to oil is 2:1.

620 parts refined soya bean oil
120 parts glycerine

The first three ingredients were weighed into the reaction vessel similar to the prior examples and the temperature of the batch increased to 270 degrees C. and held for one hour. Then the soya bean oil was added and within 15 minutes the remaining glycerine was started into the batch. The temperature dropped to 204 degrees C., and a cloudy incompatible product resulted.

This example illustrates that when the initial quantity of glycerine is in a molar ratio to the oil of 2:1, or above the ratio of 1:5 to 1, the results are unsatisfactory, and that an incompatible phase may occur in the cook.

*Example VI*

950 parts phthalic anhydride
860 parts castor oil

The glycerine divided into two parts as follows:

190 (a) parts glycerine
372 (b) parts glycerine

In this trial only the castor oil was weighed into the reaction vessel to start, and at a temperature of 276 degrees C., gained in 20 minutes, addition of phthalic anhydride was commenced. After an additional 15 minutes all of the phthalic anhydride had been added and the temperature dropped to 230 degrees C. The temperature of 276 degrees C. was regained again in 45 minutes and the oil was substantially dehydrated upon holding the temperature one hour. Part (a) of the glycerine shown above was added, the temperature dropped to 500 degrees F., and the batch formed an irreversible gel or "monkey" within the time of the glycerine addition, or about 10 minutes. It was therefore impossible to carry the reaction further and the 372 (b) parts of glycerine were not added.

This example illustrated that some glycerine is necessary in the first stage of the production cycle in order to form a homogeneous end product, and that the use of phthalic anhydride and castor oil by themselves during the first stage is also outside the scope of the invention.

*Example VII*

(a) 500 parts alkali refined linseed oil
165 parts glycerine
0.6 part litharge were first heated to a temperature of 205 degrees C. and held within a 202 to 212 degrees C. range for three hours under an inert gas blanket to form a mixed mono- and diglyceride of linseed oil.

(b) 500 parts phthalic anhydride
620 parts castor oil
55 parts glycerine were reacted separately from part (a) as in the first stages of Example I, until the castor oil was substantially dehydrated. In this dehydration reaction the molar ratio of phthalic anhydride to oil is 5:1, and the molar ratio of glycerine to oil is 0.9:1 during the first, or dehydration, stage.

After completion of the dehydration stage, the above prepared (a) oil-like alkyd forming alcohol ester (a mixed fatty oil glyceride formed as shown) was added and the temperature adjusted to 248 degrees C. until the acid value was within the range of from 5 to 15.

This example illustrates a modification by adding an alkyd forming alcoholic reactant after the oil has been dehydrated by the first step or stage, and esterification of the mixed mono- and diglyceride fatty material as a second phase of the operation to form an alkyd varnish of greater oil length. A further purpose of this example is to illustrate the flexibility of the invention.

*Example VIII*

500 parts phthalic anhydride
620 parts castor oil
55 parts glycerine

The above ingredients were weighed into a stainless steel varnish kettle as in Example I and heated to 270 degrees C. in an hour more or less.

It will be noted that the molar ratio of phthalic anhydride to oil at this stage of the process is about 5:1 and the ratio of glycerine to oil is 0.9:1, both of which ratios are within the critical range.

After 270 degrees C. had been reached 500 parts of refined soya bean oil was added portionwise over the next hour at which time the temperature was 260 degrees C. Another 165 parts of glycerine was added thereafter and the temperature lowered to 240 degrees C. ±10 degrees where it was held for about two and one-half hours. The acid value fell to about 11 and the resin was removed from the fire and thinned to 50% solids with xylene after partial cooling.

It will be noted in this example that a drying oil ester and a polyhydric alcohol were added after the dehydration step as alkyd resin forming reactants.

For the purposes of the present invention, the process has been described with particular reference to castor oil, but it will be appreciated that other hydroxylated oils might be similarly dehydrated and conjoined with alkyd forming reactants to produce dehydrated oil modified alkyd compositions by the method disclosed.

The resins formed may be used in protective and decorative coatings, printing inks, and other industries wherein the oil modified alkyd resins are found advantageous.

The expression "alkyd resin," as employed in the specification and claims, is intended to include and cover the resins which are made by reaction between a polyhydric alcohol and a polybasic acid. (See Ellis, "The Chemistry of Synthetic Resins," volume 1, page 10 (1935).)

The expression "low acid value," as used herein, refers to an acid value less than 20.

The expression "polyhydric alcohol" covers alcohols containing at least two hydroxyl groups and includes the polyhydric alcohols which are useful in the manufacture of alkyd resins.

The expression "alkyd resin forming reactants and modifiers" is intended to include and to cover polybasic acids and polyhydric alcohols used in making alkyd resins, and oils and fatty bodies employed in making oil modified alkyd resins.

The expression "drying oil" is used to describe oils which upon exposure to air absorb oxygen and become hard and resinous, including soya bean oil, dehydrated castor oil, linseed oil, and similar oils which have drying properties.

Although the invention is susceptible of some variation and modification in the manner of its practical application, the temperatures employed in the first stage, or predominantly dehydrating stage, of the reaction are preferably within the range of 260 to 300 degrees C.; and the temperatures employed in the second stage, or predominantly esterification stage, are preferably within the range of 220 to 250 degrees C.

The invention has been illustrated by specific examples which indicate generally its scope, but it is to be understood that the invention is not limited thereby except as required in the following claims.

We claim:

1. A method for dehydrating castor oil and forming therewith an oil modified alkyd resin which comprises substantially dehydrating the castor oil in the presence of phthalic anhydride and glycerine, dehydrating as the primary reaction within a temperature range of from 260 to 300 degrees C., wherein the molar ratio of glycerine to the oil is not more than 1.5:1 and not less than 2:3 until the oil is dehydrated and subsequently lowering the temperature, partly by addition of a polyhydric alcohol, during a secondary phase to a range within 220 to 250 degrees C. whereupon the reaction becomes predominantly one of esterification, and holding the temperature within the lowered range until a clear, homogeneous dehydrated castor oil modified alkyd resin has formed.

2. A method for dehydrating castor oil and forming therewith an oil modified alkyd resin which comprises substantially dehydrating the castor oil as the primary reaction within a higher temperature range of from 260 to 300 degrees C., wherein during said primary phase the molar ratio of glycerine to oil is not more than 1.5:1 and not less than 2:3 and the molar ratio of phthalic anhydride to oil is not more than 7:1 and not less than 2.5:1 until the oil is dehydrated, and subsequently lowering the temperature, partly by addition of a polybasic acid, to a range within 220 to 250 degrees C., and holding the temperature within said lowered range until a clear, homogeneous oil modified alkyd resin has formed.

3. A method of manufacture of a dehydrated castor oil modified alkyd resin which comprises heating castor oil with phthalic anhydride and glycerine wherein during a primary phase the molal ratio of phthalic anhydride to oil is not more than 7:1 and not less than 2.5:1, and the molal ratio of glycerine to oil is within the range from 1.5:1 to 2:3 to a temperature within the range of from 260 to 300 degrees C., at which temperature the primary reaction phase is one of dehydration, until the castor oil has been substantially dehydrated, and thereafter adding a polyhydric alcohol and lowering the temperature during a secondary phase to a range within 225 degrees to 235 degrees C. whereupon the reaction becomes predominantly one of esterification, and holding the temperature within this range to form an oil modified alkyd resin.

4. A method of manufacture of dehydrated castor oil modified alkyd resin which comprises heating castor oil with phthalic anhydride and glycerine wherein during a primary phase the molar ratio of phthalic anhydride to oil is not more than 7:1 and not less than 2.5:1 and the molal ratio of glycerine to oil is not more than 1.5:1 and not less than 2:3 to a temperature within the range of from 260 to 270 degrees C., until the castor oil has been dehydrated, the predominant reaction during this period being one of dehydration, thereafter lowering the temperature to a range of from 225 to 235 degrees C. whereupon the reaction becomes predominantly one of esterification, adding a polybasic acid, and holding the temperature within this range until a clear homogeneous low acid value oil modified alkyd resin has formed.

5. A method for dehydrating castor oil and forming therewith an oil modified alkyd resin which comprises substantially dehydrating the castor oil as the primary reaction within a higher temperature range of from 260 to 300 degrees C. wherein the molar ratio of phthalic anhydride to oil is not more than 7:1 and not less than 2.5:1 and the molar ratio of glycerine to oil is not more than 1.5:1 and not less than 2:3, and subsequently lowering the temperature, by addition of a drying oil ester and a polyhydric alcohol, to a point within the range of from 220 to 250 degrees C. wherein the predominant reaction becomes one of esterification, and holding the temperature within the lowered range until a clear, homogeneous dehydrated castor oil modified alkyd resin has formed.

6. A method of making a dehydrated castor oil modified alkyd resin which comprises heating castor oil with phthalic anhydride and glycerine, wherein during a primary phase the molal ratio of phthalic anhydride to oil is not more than 7:1 and not less than 2.5:1, and the molal ratio of glycerine to oil is within the range of 1.5:1 to 2:3, to a temperature within the range of from 260 degrees C. to 300 degrees C., at which temperature the primary reaction phase is one of dehydration, until the castor oil has been substantially dehydrated, and thereafter adding at least one substance from the group consisting of polyhydric alcohols, polybasic acids, drying oils, and drying oil esters and lowering the temperature during a secondary phase to a range within 220 degrees C. to 250 degrees C. whereupon the reaction becomes predominantly one of esterification, and holding the temperature within this range until a clear homogeneous oil modified alkyd resin is formed.

7. A method of making a dehydrated castor oil modified alkyd resin which comprises heating castor oil with phthalic anhydride and glycerine, wherein during a primary phase the molal ratio of phthalic anhydride to oil is not more than 7:1 and not less than 2.5:1, and the molal ratio of glycerine to oil is within the range of 1.5:1 to 2:3, to a temperature within the range of from 260 degrees C. to 270 degrees C., at which temperature the primary reaction phase is one of dehydration, until the castor oil has been substantially dehydrated, and thereafter adding at least one substance from the group consisting of polyhydric alcohols, polybasic acids, drying oils, and drying oil esters and lowering the temperature during a secondary phase to a range within 225 degrees C. to 235 degrees C. whereupon the reaction becomes predominantly one of esterification, and holding the temperature within this range until a clear homogeneous oil modified alkyd resin is formed.

8. A method of making a dehydrated castor oil modified alkyd resin which comprises heating castor oil with phthalic anhydride and glycerine, wherein during a primary phase the molal ratio of phthalic anhydride to oil is not more than 7:1 and not less than 2:1 and the molal ratio of glycerine to oil is within the range from 1.5:1 to 2:3, to a temperature within the range of from 260 degrees C. to 300 degrees C., at which temperature the primary reaction phase is one of dehydration, until the castor oil has been substantially dehydrated, and thereafter adding additional quantities of phathalic anhydride and glycerine, and lowering the temperature during a secondary phase to a range within 220 degrees C. to 250 degrees C., whereupon the reaction becomes predominantly one of esterification, and holding the temperature within this range to form an oil modified alkyd resin.

CHARLES A. COFFEY.
WILLIAM T. WALTON.
NORMAN BRITAN.

REFERENCES CITED

The following references are of record in the file of this patent:

UNITED STATES PATENTS

| Number | Name | Date |
|---|---|---|
| 2,319,022 | Waldie | May 11, 1943 |

FOREIGN PATENTS

| Number | Country | Date |
|---|---|---|
| 431,495 | Great Britain | July 9, 1935 |

OTHER REFERENCES

"German Plastics Practice," De Bell et al., 1946, Springfield, Mass., pages 254, 255.

Certificate of Correction

Patent No. 2,528,946                                           November 7, 1950

CHARLES ADAMS COFFEY ET AL.

It is hereby certified that error appears in the printed specification of the above numbered patent requiring correction as follows:

Column 4, line 57, for "1.8" read *1.18*;

and that the said Letters Patent should be read as corrected above, so that the same may conform to the record of the case in the Patent Office.

Signed and sealed this 16th day of January, A. D. 1951.

[SEAL]

THOMAS F. MURPHY,
*Assistant Commissioner of Patents.*